United States Patent
Maluf et al.

(10) Patent No.: US 9,824,128 B1
(45) Date of Patent: Nov. 21, 2017

(54) SYSTEM FOR PERFORMING SINGLE QUERY SEARCHES OF HETEROGENEOUS AND DISPERSED DATABASES

(71) Applicant: The United States of America as Represented by the Administrator of the National Aeronautics & Space Administration (NASA), Washington, DC (US)

(72) Inventors: David A. Maluf, Mountain View, CA (US); Mohana M. Gurram, Sunnyvale, CA (US); Christopher D. Knight, Santa Clara, CA (US); Takeshi Okimura, San Jose, CA (US); Vu Hoang Tran, San Jose, CA (US); Anh Ngoc Trinh, San Jose, CA (US)

(73) Assignee: The United States of America as Represented by the Administrator of NASA, Washington, DC (US)

(*) Notice: Subject to any disclaimer, the term of this patent is extended or adjusted under 35 U.S.C. 154(b) by 384 days.

(21) Appl. No.: 13/956,929

(22) Filed: Aug. 1, 2013

Related U.S. Application Data

(60) Provisional application No. 61/678,577, filed on Aug. 1, 2012.

(51) Int. Cl.
*G06F 17/30* (2006.01)
*G06F 17/27* (2006.01)

(52) U.S. Cl.
CPC .... *G06F 17/30554* (2013.01); *G06F 17/2705* (2013.01)

(58) Field of Classification Search
CPC ......... G06F 17/30545; G06F 17/30566; G06F 17/30893; G06F 17/3053; G06F 17/30525; G06F 17/30592; G06F 17/30991; G06F 17/2705
See application file for complete search history.

(56) References Cited

U.S. PATENT DOCUMENTS

| | | | |
|---|---|---|---|
| 6,233,586 B1 * | 5/2001 | Chang et al. | |
| 6,519,618 B1 * | 2/2003 | Snyder | G06Q 10/10 707/738 |
| 6,704,720 B2 * | 3/2004 | Arai et al. | 707/749 |
| 6,968,338 B1 | 11/2005 | Gawdiak et al. | |
| 7,366,735 B2 | 4/2008 | Chandrasekar et al. | |

(Continued)

OTHER PUBLICATIONS

Dictionary.com "flat file database," in The Free On-line Dictionary of Computing. Source location: Denis Howe. http://dictionary.reference.com/browse/flat-file-database. Accessed: Mar. 2, 2016.*

(Continued)

*Primary Examiner* — Robert Beausoliel, Jr.
*Assistant Examiner* — Arthur Ganger
(74) *Attorney, Agent, or Firm* — Christopher J. Menke; Robert M. Padilla; Mark P. Dvorscak

(57) ABSTRACT

The present invention is a distributed computer system of heterogeneous databases joined in an information grid and configured with an Application Programming Interface hardware which includes a search engine component for performing user-structured queries on multiple heterogeneous databases in real time. This invention reduces overhead associated with the impedance mismatch that commonly occurs in heterogeneous database queries.

25 Claims, 5 Drawing Sheets

(56) References Cited

U.S. PATENT DOCUMENTS

| | | | |
|---|---|---|---|
| 7,478,100 | B2 | 1/2009 | Murthy et al. |
| 7,487,146 | B2* | 2/2009 | Friedman ............ G06F 11/3438 |
| 7,499,915 | B2 | 3/2009 | Chandrasekar et al. |
| 7,797,381 | B2 | 9/2010 | Zhang et al. |
| 7,801,876 | B1* | 9/2010 | Riley et al. ................... 707/706 |
| 8,195,690 | B2 | 6/2012 | Hou et al. |
| 8,209,352 | B2 | 6/2012 | Murthy et al. |
| 8,874,545 | B2* | 10/2014 | Gutlapalli et al. ............ 707/707 |
| 9,031,926 | B2* | 5/2015 | Milward et al. .............. 707/706 |
| 9,053,149 | B2* | 6/2015 | Ebenstein ......... G06F 17/30451 |
| 2006/0004739 | A1* | 1/2006 | Anthony ........... G06F 17/30587 |
| 2012/0192096 | A1* | 7/2012 | Bowman ............... G06F 3/0481 715/780 |
| 2014/0229462 | A1* | 8/2014 | Lo ..................... G06F 17/30528 707/707 |
| 2014/0324835 | A1* | 10/2014 | Schiller ............. G06F 17/30991 707/722 |
| 2016/0140254 | A1* | 5/2016 | Yan ....................... G06F 3/0484 715/771 |

OTHER PUBLICATIONS

Webopeida "flat file database," Source location: http://www.webopedia.com/TERM/F/flat_file_database.html. Accessed: Mar. 1, 2016.*

Maluf, et al., An Extensible "Schema-less" Database Framework for Managing High-throughput Semi-Structured Documents, Jan. 2, 2002.

Maluf, et al., Netmark: A Schema-less Extension for Relational Databases for Managing Semi-Structured Data Dynamically, Foundations of Intelligent Systems Lecture Notes in Computer Science, Proceedings of the 14th International Symposium, ISMIS 2003, Oct. 28-31, 2003, 231-241, 2871, Maebashi City, Japan.

Maluf, et al., An Extensible "Schema-Less" Database Framework for Managing High-Throughput Semi-Structured Documents, May 19, 2003.

Lin, et al., Adding Hierarchical Objects to Relational Database General-Purpose XML-Based Information Managements, NASA Tech Briefs, Nov. 16, 2006.

* cited by examiner

FIG. 2c

SYSTEM FOR PERFORMING SINGLE QUERY SEARCHES OF HETEROGENEOUS AND DISPERSED DATABASES

CLAIM OF PRIORITY

This patent application claims priority to U.S. Provisional Patent Application No. 61/678,577, filed on Aug. 1, 2012.

ORIGIN OF INVENTION

The invention described herein was made in the performance of work under National Aeronautics and Space Administration (NASA) contracts and by employees of the United States Government and is subject to the provisions of Section 20135(b) of the National Aeronautics and Space Act of 1958, Public Law 111-314, §(124 Stat. 3330, 51 U.S.C.; Chapter 201) and 35 U.S.C. §202, and may be manufactured and used by or for the Government for governmental purposes without the payment opf any royalties thereon or therefore.

FIELD OF INVENTION

The present invention is a distributed computer apparatus and system and method for performing a search of multiple highly distributed heterogeneous databases containing structured, semi-structured and unstructured data during a single search session.

DESCRIPTION OF THE PRIOR ART

Government and private enterprises are highly dependent on distributed databases used for operations management and research and analytics. For example, the National Aeronautics and Space Administration (NASA) and its contractors maintain hundreds of databases that store millions of records. These databases include diverse document file-types having thousands of explicit and implicit structures.

The Impedance Issue: Matching User Applications to Databases

"Impedance" is a term used to describe a significant problem known in the art faced by database programmers and application developers. Impedance is a mismatch between user-interface programming languages (e.g., Java and C++) and the logical language structure of most databases user interface applications may query.

Most databases use the "relational" database model. The relational database model uses a collection of tables to store and retrieve data. During a search, a "primary key" and a "foreign key" are used to correlate data between tables and return a search result.

In contrast, most application programming languages use the "semantic" or "object oriented" programming language model in which terms are assigned meaning within the context of a particular computer program. For example, a programmer creating a financial API may select terms (called objects) such as "customer," "product," "credit limit," or "net sales" and assign them meanings and properties.

The object-oriented terms of the semantic model do not logically interface with relational database architectures. Semantic and relational database models have little in common and have historically been developed in isolation from one another.

Consequently, programmers are required to write large and complex amounts of object-to-relational mapping code in order to convert data to a tabular format the database can understand. Likewise, the developers must convert the relational information returned from the database into the object format developers require for their programs. Commercial enterprise database management systems (DBMS), which have an integrated hybrid cooperative approach to an object-relational model, are known in the art. NASA and other researchers have engaged in considerable research to address this problem.

Extensible Markup Language (XML) is a "markup" language used to incorporate object-oriented programming features into traditional relational database systems. Database information is still stored within relational tables, but some of the tables may include objects with properties found in the object oriented programming languages. XML is an important component for maintaining an information grid of heterogeneous computer databases for NASA known as the GXD framework.

The GXD Framework Model

The GXD Framework utilizes existing international protocol standards of the World Wide Web Consortium Architecture Domain, and the Internet Engineering Task Force, primarily HTTP, XML and WebDAV. Through a combination of these international protocols, universal database record identifiers and physical address data types, GXD enables an unlimited number of desktops and distributed information sources to be linked seamlessly and efficiently into the information grid.

One of the features of GXD is that it allows data to be viewed on the heterogeneous databases through an interconnected set of data nodes. A node is a logical unit of information. NASA's GXD Framework provides data management, storage, retrieval, and discovery function by transforming large quantities of highly heterogeneous data formats into a common XML-based standard.

Performing Complex Queries on Hetrogeneous Document Formats

The NASA Technology Transfer System (NTTS) is a software application which provides support for users of the GXD framework including: (1) user and programming interfaces; (2) information bus software; (3) daemon processors; (4) GXD search functions; and (5) a set of extensible application programming interfaces (APIs).

Like the GXD framework, NTTS requires a processor which converts data to an XML format. As the data is saved in XML format, the GXD Framework parser stores the content in a connected node structure in a "schema-less" database.

It is desirable to allow users to efficiently query distributed heterogeneous databases joined by URLs in an information grid without the need to convert data from each database to an XML format.

It is further desirable to provide users with the capability to abstract and view a relevant subset of fields contained in the thousands of data fields found in a heterogeneous dataset.

It is further desirable to have an industry-standard API for users to access information grids comprised of heterogeneous databases and to develop industry specific research solutions.

It is further desirable to have a standard API for querying information grids which can be collaboratively developed by the government and private sector.

Terms of Art

As used herein, the term "API processing computer" means a computer or plurality of computer hardware components on which an API is run.

As used herein, the term "application programming interface" ("API") refers to a protocol used as an interface by software components to communicate with other software components.

As used herein, the term "connected node structure" means units of information searched within an information grid.

As used herein, the term "context field" means a field associated with a document tag or any code identifying any feature or content of any document.

As used herein, the term "distributed computer apparatus" means a system of interactive of hardware components whether on the same computer or geographically separated.

As used herein, the term "document tags" means code associated with any content or identifying feature of a document which is potentially searchable, indexable or retrievable.

As used herein, the term "information grid" means computers operatively connected for searching.

As used herein, the "join processor" means a processor which merges two or more search results during a single search session.

As used herein, the term "key" or "search key" means any alphanumeric symbol or character (singly or in combination) which may be used to query tables, nodes, objects, the icon or symbol used to make an inquiry.

As used herein, the term "logical operations processor" means a processing component capable of filtering data based on any logical process known in the art.

As used herein, the term "markup language" refers to a set of rules for encoding documents in a format that is human readable, called a schema. An example of markup language includes, but is not limited to, XML.

As used herein, the term "multiple search query processor" means a processor which merges queries performed during multiple search sessions.

As used herein, the term "plurality" means the quality of having more than one.

As used herein, the term "processor" or "processing component" means a hardware component with processing capability to transform data structures.

As used herein, the term "quasi-unique search" means created in real time based on data entered by a particular user.

As used herein, the term "query processor" means any hardware component for processing a query object, data record or user-defined schema and producing a set of query results.

As used herein, the term "search query object" means any software object or data structure which contains objects, properties or functions for performing a search of one or plurality of heterogeneous databases, including but not limited to user-defined schema value.

As used herein, the term "real time" means during a single user-defined search session.

As used herein, the term "registrar computer" means a computer or data storage component which contains information related to locating and querying a plurality of heterogeneous databases.

As used herein, the term "schema-less" or "schema-less database" means the absence of schema relationships which have been defined by programming at the database level.

As used herein, the term "semi-structured documents" refers to a set of database documents containing both database documents that are organized according to a data model and database documents that are not organized according to a data model. Semi-structured documents contain a mixture of structured data, such as data that has been tagged using a markup language, and unstructured data that has not been tagged, or otherwise identified or organized.

As used herein, the term "structured documents" refers to a set of documents in which the documents are organized according to a defined data model with rules or conventions.

As used herein, the term "tag relationship comparison processor" means a processor that returns a result based on a user-defined relationship between tags.

As used herein, the term "unstructured documents" refers to a set of documents in which the database documents are not organized according to a defined data model with rules or conventions.

As used herein, the term "user-defined schema" means schema defined by the user to identify relationships between categories of data or entities in a plurality heterogeneous databases. The system may further define implicit relationships based on user-defined schema.

As used herein, the term "user entered query context value" means a value selected by a user which corresponds to at least one document tag in at least one heterogeneous database within a heterogeneous database query system.

SUMMARY OF THE INVENTION

The present invention relates to the creation of a query database comprised of a plurality of database queries of databases containing structured, unstructured, and semi-structured documents. The present invention is configured to connect to a plurality of heterogeneous databases comprising: structured, unstructured, and semi-structured documents; receive a search query; and search said databases. The search query comprises a database context, a logical operator, and a search key. The results of said search query are then returned to user. The system is also configured with a relate function that can relate the results of multiple search queries and a join function that can perform set operations including union, intersection, and difference on the search results.

BRIEF DESCRIPTION OF THE DRAWINGS

FIGS. 2a-2c illustrate an exemplary embodiment of a user interface for a system for performing single query searches of heterogenous and dispersed databases.

DETAILED DESCRIPTION OF INVENTION

Figure 1:
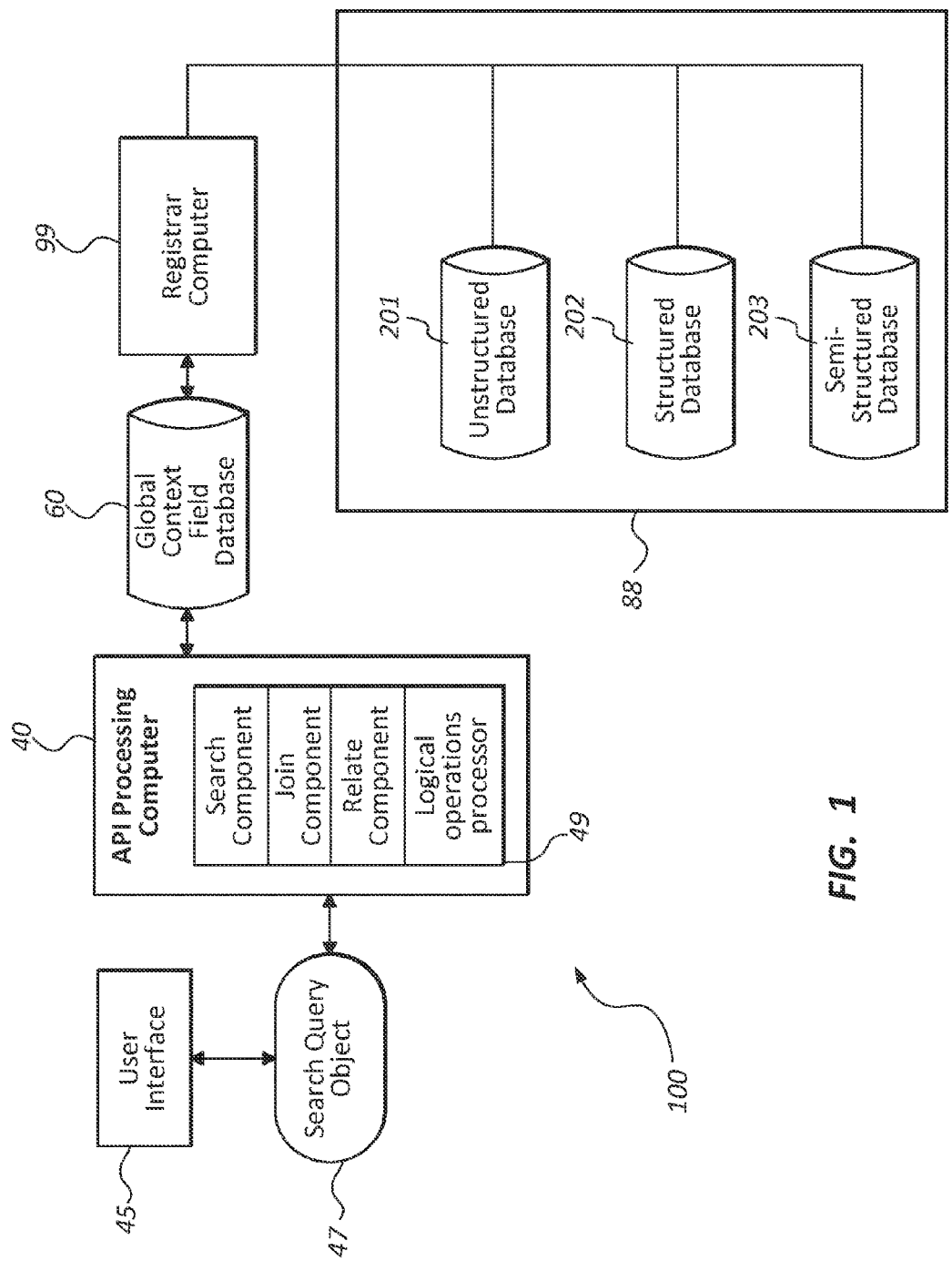
FIG. 1 illustrates a schematic diagram of an exemplary embodiment of a system for performing single query searches of heterogenous and dispersed databases.

For the purpose of promoting an understanding of the present invention, references are made in the text to exemplary embodiments of a system for performing single query searches of heterogenous and dispersed databases, only some of which are described herein. It should be understood that no limitations on the scope of the invention are intended by describing these exemplary embodiments. One of ordinary skill in the art will readily appreciate that alternative, but functionally equivalent components and configurations may be used. One of ordinary skill in the art may deem the inclusion of additional elements to be readily apparent and obvious. Specific elements disclosed herein are not to be interpreted as limiting, but rather as a basis for the claims and as a representative basis for teaching one of ordinary skill in the art to employ the present invention.

It should be understood that the drawings are not necessarily to scale and that processes are not necessarily disclosed in the order in which they are performed. Instead, emphasis has been placed upon illustrating the principles of the invention. In addition, in the embodiments depicted herein, like-reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 illustrates a schematic diagram of an exemplary embodiment of heterogeneous database system 100. In the embodiment shown, heterogeneous database search system 100 is an integrated apparatus comprised of an API processing computer 40 and a user interface 45 (which may communicate with each other), as well as a search query object 47. Heterogeneous database search system 100 further comprises a global context field database 60 operatively communicating with said API processing computer 40, and a registrar computer 99. Within said heterogeneous database search system 100, said registrar computer 99 may further operatively communicate with an information grid 88 comprised of a plurality of geographically dispersed heterogeneous databases 201, 202, 203. API processing computer 40 may further comprise at least one logical operations processor 49, search component, relate component, and/or join component.

In the exemplary embodiment shown, each of the heterogeneous databases are "external" to the system, and are independently created and maintained outside the system, but are located and operatively connected to the system using URL's which provide a means for locating them and accessing their content.

Additionally, each of the exemplary heterogeneous document formats of the heterogeneous databases are associated with data structures and tags which are created independently of any process performed by any component of heterogeneous database system 100.

In the embodiment shown, dispersed heterogeneous databases 201, 202, 203 and their associated URL's form an information grid 88 which may be comprised of various structured, semi-structured and unstructured databases and other resources, Extensible resources may be continuously added for searching information grid 88.

In the exemplary embodiment shown, API processing computer 40 is connected to the plurality of heterogeneous databases 201, 202, 203. The API processing computer is also operatively connected with a global context field database 60, which tracks all known context fields for all known heterogeneous databases within heterogeneous database system 100.

Heterogeneous databases 201, 202, 203 include: structured databases 201, containing structured database documents; unstructured databases 202, containing unstructured database documents; and semi-structured databases 203 containing semi-structured database documents.

Structured databases 201 are comprised of database documents and data organized according to a defined data model. An example of a structured database 201 is a relational database organized into rows and columns with similar data types grouped together. Apart from the organization of the set of database documents, the data contained in any individual database document may be organized according to a defined data model. For example, the data in the database documents may be tagged using a markup language (e.g., extensible markup language), so that individual pieces of data in a document can be associated with a defined context relating to that data tag.

Semi-structured databases 203 are sets of database documents containing both database documents that are organized according to a data model and database documents that are not organized according to a data model. In various embodiments, semi-structured database documents 203 may contain a mixture of structured data, such as data that has been tagged using a markup language, and unstructured data that has not been tagged or otherwise identified or organized.

Unstructured databases 202 are sets of documents that are not organized according to a defined data model. An example of an unstructured database 202 is a set of database documents stored without any method of identifying the type of data residing on any individual document and in which the documents are not already grouped according to their data type.

API processing computer 40 is capable of communicating with said plurality of heterogeneous databases 201, 202, 203, and retrieving a set of context fields stored on said heterogeneous databases 201, 202, 203.

In the embodiment shown, heterogeneous databases 201, 202, 203 are joined into an information grid by URLs. When API processing computer 40 connects to heterogeneous databases 201, 202, 203 in information grid 88, API processing computer 40 stores the identities of heterogeneous databases 201, 202, 203 in global context field database 60. Global context field database 60 maintains a record of all user input with API processing computer 40 as well as a record of all communication between API processing computer 40 and heterogeneous databases 201, 202, 203.

API processing computer 40 may then store the set of context fields retrieved from the plurality of heterogeneous databases 201, 202, 203 in global context field database 60, connected to API processing computer 40.

API processing computer 40 displays user interface 45, through which a user may enter input and view output. A user may interact with the system for performing single query searches of heterogeneous database system 100 through user interface 45, as in the exemplary embodiment shown in FIGS. 2a-2c.

API processing computer 40 includes various processing components for performing heterogeneous database searches, such as at least one logical operations processor 49, search component, relate component, and/or join component.

In the embodiment shown, API processing computer 40 is operatively coupled to user interface 45. In the exemplary embodiment shown, API processing computer 40 is configured with a global context field database 60 which contains context fields and/or tags associated with all known databases.

In various embodiments, API processing computer 40 may be configured to display objects belonging to classes, which are updated to user interface 45 to display search options, receive search criteria and display search results. This may include an API, including classes.

In the embodiment shown, global context field database 60 correlates the context fields to the appropriate database when user specifies, or otherwise selects a context field and search value for a query (See FIGS. 2a-2c below). Global context field database 60 also updates the dataset of context fields as these fields are changed or identified within the heterogeneous databases 201, 202, 203.

User interface 45 is dynamically updated in real time (during a single user session) to display available context fields that may be organized into groups and subsets in order to facilitate user access.

These groups and subsets of context fields may be represented as data structures, or within data structures. Context fields may be represented as properties, classes, and objects having user modifiable properties. These properties may include properties and functions to create a user interface to track search terms entered and to invoke search functions.

In the embodiment shown, various functions invoked by API processing computer 40 allow a user to define data schema and create search query object 47 or other data structures, which include properties to determine queries to be performed. It is a critical feature of the invention that properties within API processing computer 40 are defined at the application level on user interface 45 rather than programmed and/or hard-coded at the database or information grid level. This capability allows potentially millions of users to identify relevant data relationships and modify them in real time rather than relying on more rigid, costly and time consuming programming at the database level. This capability enables the creation of rich, complex and dynamically updated search query object 47 to be defined by users. This enables unprecedented variations in searches to perform complex analytics without the restriction of representing such searches in database tables.

In various embodiments, API processing computer 40 is configured with data storage capability for saving search query object 47. In various embodiments, search query object 47 has properties and invokes functions that may be substituted for complex database schemas and application source code required to bind the application to the database. In various embodiments, the capabilities of API processing computer 40 can be integrated with search and retrieval features used to manage an information grid (e.g., NASA's GDX Framework). Data can be retrieved using the search features incorporated into information grid 88.

User interface 45 is continuously updated as a user modifies the properties of search query object 47. As a user modifies search query object 47, search results are returned, and the information may be displayed in real time during a single user search session. In other embodiments, a search session may span a single time frame or be conducted in multiple time frames.

In various embodiments, API processing computer 40 may successfully update user interface 45 with a context field list, which is a subset of context fields stored in global context field database 60.

In various embodiments, user modifiable properties of search query object 47 are originally selected and modified by entering user-modifiable properties displayed in a user readable format. A user readable format may include HTML forms or other user-readable formats known in the art.

Heterogeneous database system 100 allows a user without prior programming experience to search deeply within a potentially large number of user selected databases without re-formulating the searches to comply with specific search rules for each database.

In various embodiments, user interface 45 displays menus or other elements configured to display information to a user, such as databases available for searching and the available context fields which user may select in order to search each database (See FIGS. 2a-2c below).

In various embodiments, API processing computer 40 may be configured to receive values inputted by a user, administrator, program or database designer, to develop customized queries necessary for complex or newly identified analytics, or for entity-specific solutions.

Values that may be entered through the use of menus, user interface prompts, or other input methods include, but are not limited to: database identifier values; search context values; set operation identifiers; or any other alpha numeric symbol or semantic identifier relevant to developing queries or specifying results to be returned from a search of heterogeneous databases.

In successive queries of multiple interfaces, user interface 45 may be updated to allow a user to enter a search key or context term based on the results of the first query in real time during a single user session. The user can then seamlessly query multiple heterogeneous databases.

In the embodiment shown, API processing computer 40 and user interface 45 are configured to accept database identifier values from a user to identify a known database from a set of identified heterogeneous databases 201, 202, and 203.

While performing the successive context searches, a user may select a search key. The search key may be any search term user inputs including, but not limited to, the set of all alphanumerical characters. The API processing computer 40 stores the search key in search query object 47. The user may add additional context field values, logical operators or search keys to the search query object through continuously updated user interface 45.

In this exemplary embodiment, search query object 47 invokes functions to update user interface 45 with the results the query of the first data base, and return and update search query object 47.

In one embodiment a user invokes functions of a search query object 47 using logical operations processor 49 of API processing computer 40. These logical functions contain functions which may be invoked to filter the results of the queries performed. Logical operations, which may be performed by logical operations processor 49 includes, but is not limited to, the following: logical operations, contains, not contains, greater than, less than, greater than or equal, less than or equal, equal to, not equal. The logical operations performed by logical operations processor 49 limit the scope and succession of results returned from the information grid 88. API processing computer 40 stores the set of logical operators searched and the results produced in search query object 47.

Figure 2A:
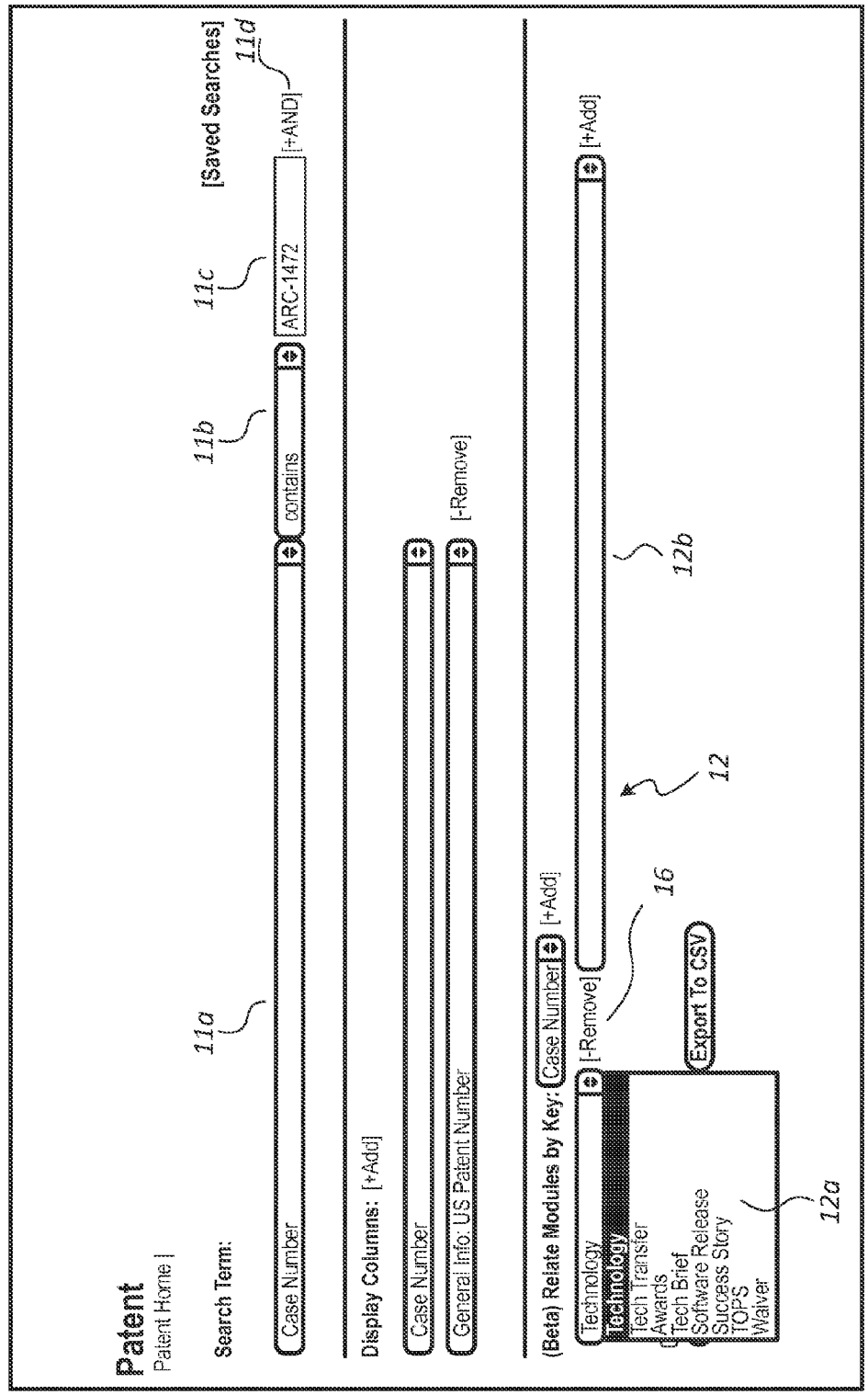
Figure 2B:
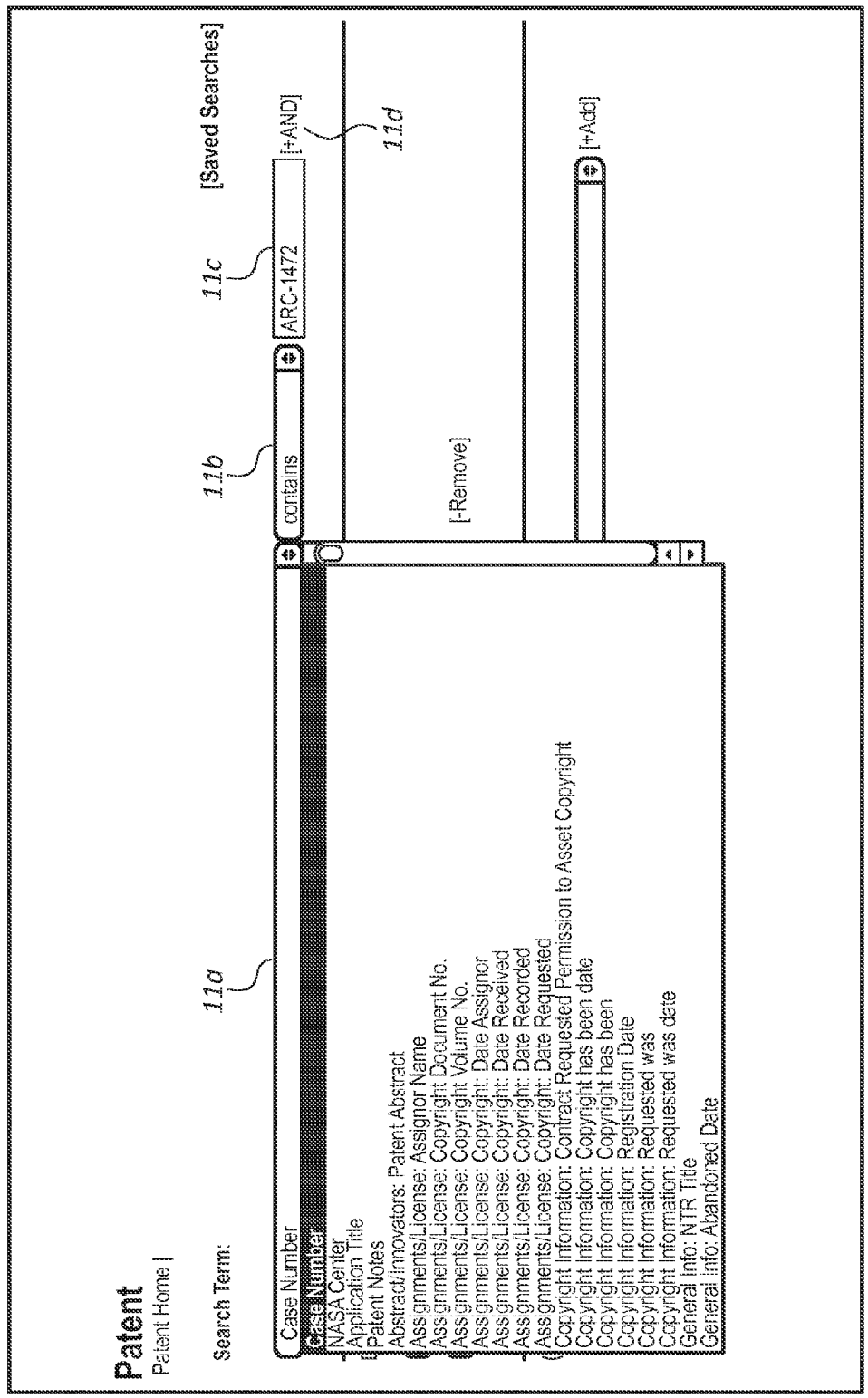
Figure 2C:
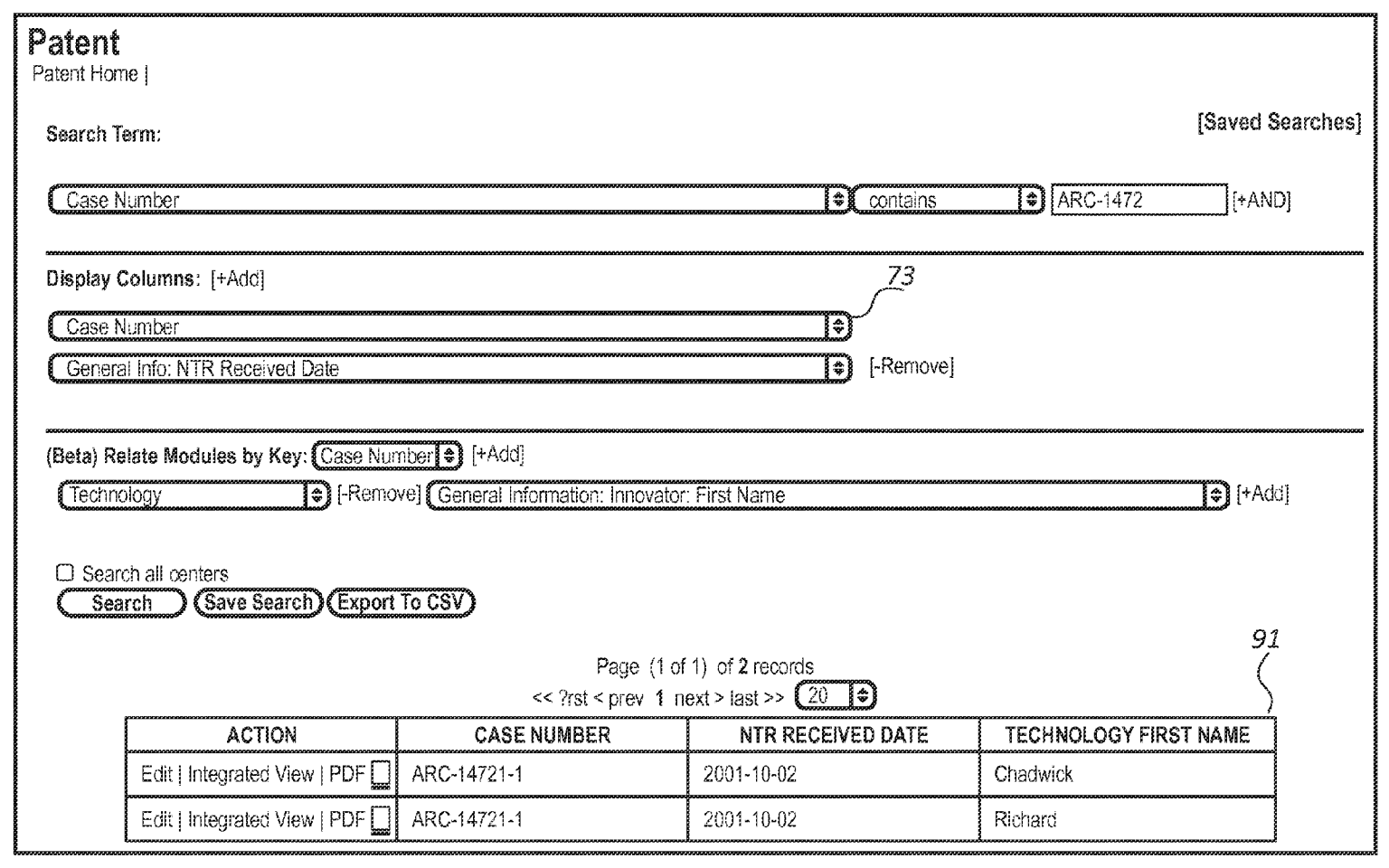

FIGS. 2a-2c illustrate exemplary embodiments of updated user interface 45. In the embodiment shown, a user dynamically builds a query structure at user interface level using user-defined schema without the requirement of programming by a programmer at the database level. The query structure created by user may be stored in any data structure known in the art.

Using the exemplary interfaces shown in FIGS. 2a-2c, user successively identifies databases to be searched and the relationships between context fields in each heterogeneous database, and defines the relevant relationship between the various context fields available in each of structured, unstructured and semi-structured databases.

In the embodiment shown, a user is presented with menu options to display the available databases that may be searched and continuously updated menus or other graphic elements to cue user to select from the search terms (contexts) available within the collection of heterogeneous databases. Using drop-down menus a user may view database listings, context fields, and various types of set operations displayed for selection. For example, context fields to be used as search terms (e.g. keys) are selected from a menu of available context fields in each known database.

In various embodiments, options may be modified, supplemented or reprogrammed to reflect any context field or searchable database. In still other embodiments, a user may enter context fields or other options directly into a field.

In the embodiment shown, the search algorithms are encapsulated into three different classes: Search, Relate and Join. Search criteria can be combined using logical operators AND, OR to provide a rich set of results.

The Search class provides the API to query individual modules (collection of XML data) having similar schema. The Relate class provides the API to relate search results from one module to other modules with user-defined keys (XML tag names) among modules. The Join class provides the capability to perform set operations (union, intersection and difference) on produced search result.

The outputs of queries may be displayed as a table. Since the result-sets produced are interpreted as two-dimensional datasets, the framework provides basic set operations like Union, Intersection and Difference that can be performed provided a key is defined to relate among the result-sets.

FIG. 2a illustrates an exemplary embodiment of search query user interface 45 which is configured in order to enable a user to perform a query on a first heterogeneous database selected from a list or set of available databases (not shown). FIG. 2a illustrates context fields 11a, logical operator field 11b, and search term field 11c.

In the exemplary embodiment shown, user has selected "case number" in context fields 11a. User has also entered "contains" in logical operator field 11b. User has entered "ARC-1472" in search term field 11c.

FIG. 2a also shows "AND" search function selector 11d. This option creates an additional row containing context fields 11a, logical operator field 11b, and search term field 11c. This field enables a user to add an additional context field to the current search. In the exemplary embodiment shown, remove relate interface selector 16 allows user to remove a currently existing context field from the current search.

In the embodiment shown, context field 11a includes a drop-down menu of available context fields, which may be searched in the "Patent" database which user has selected in this illustration.

In the embodiment shown, logical operator field 11b displays a drop-down menu from which user may select a logical operator to define a search. In various embodiments, logical operators may be any alphanumeric character or symbol that represents any operation, function, or filtering operation known in the art, which may be performed on a database. Examples of logical operator operators include but are not limited to:

Contains: searches for records/documents with keywords and sentences within a context.
Not Contains: searches for records/documents that do not contain keywords and sentences within a context.
Equal: searches for records/documents with keywords and sentences that match exactly with data within a context.
Not Equal: searches for records/documents with keywords and sentences that do not match exactly with data within a context.
Less Than or Equal: searches for records/documents with data within a context that is less than or equal to provided value, and applies it to both date and numeric data types.
Greater Than or Equal: searches for records/documents with data within a context that is greater than or equal to provided value, and applies it to both date and numeric data types.
Greater Than: searches for records/documents with data within a context that is greater than provided value, and applies it to both numeric and date data types.
Less Than: searches for records/documents with data within a context that is less than provided value, applies it to both numeric and date data types.

Also illustrated in FIG. 2a is search term field 11c, which is adapted to receive either a user-entered search term for the selection of a search term that is related to a field, or a specific term within context fields 11a by the logical operator selected in the logical operator field 11b to define the query performed.

Various embodiments may have more or fewer search term fields, and logical operators may further describe the relationship between the fields. This permits users to reflect specific programming application needs, both current and contemplated, as they may configure alternative embodiments of search term fields and logical operation fields.

Relate field section 12 includes fields to query additional (subsequent) databases after the results of the search on the first database are returned. A user can select a second heterogeneous database using a database list displayed in database selection drop-down menu 12a. The user specifies a second and subsequent database to be related to each other during a query session using search term field 12b. The search key for second and subsequent databases may be a term based on the results returned from the first search. This feature allows a user to dynamically create and update database relationships that a programmer would otherwise have to create. A user may do so dynamically during the search session.

Heterogeneous database system 100 contemplates that a user is in a better position to identify critical relationships between databases during a dynamic search, as opposed to a disinterested programmer who would define these relationships in advance for the same query.

FIG. 2b illustrates context field 11a with the drop-down menu of available context fields fully displayed.

As illustrated in FIG. 2c, searches are displayed in table display format 91 according to preferences expressed by user. This includes display fields 73 that allow a user to choose how data is displayed.

Figure 3:
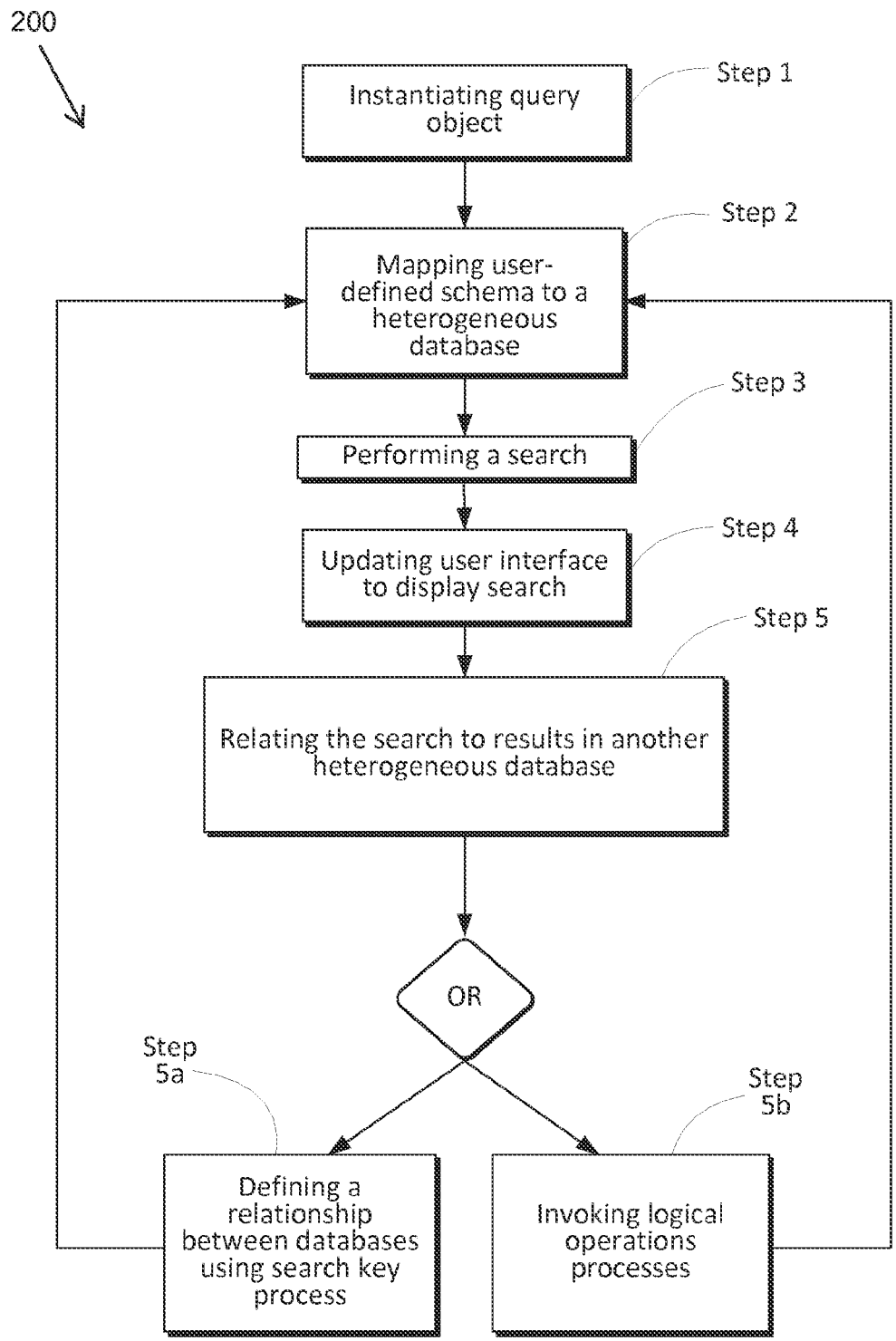
FIG. 3 illustrates a high-level flow diagram, showing the operation of a system for performing single query searches of heterogenous and dispersed databases.

FIG. 3 illustrates the processing of a complex search query performed using a heterogeneous database system 100 using Method 200.

In this exemplary embodiment, the query is: "[F]ind all the technologies that are reported in Fiscal Year 2010, third quarter, with specific inventor that are been patented and awarded and not licensed yet but have leads."

To perform exemplary search Method 200, user enters user-defined schema into heterogeneous database system 100, and it is not necessary to have a programmer create schema for the various relational tables in the heterogeneous database.

In this example, a user obtains three successively filtered query datasets. These result data sets are obtained during a single query session in real time to query multiple dispersed heterogeneous databases.

Step 1 comprises instantiating a query object. The user instantiates an instance of a search query object corresponding to a search session, using API processing computer 40 and user interface 45. Search query object 47 is a data structure having properties related to the search session. In various embodiments, the search session may be conducted in real time or over several time intervals.

Search query objects include properties corresponding to schema values defined by a user (e.g., search context fields). Other properties within search query object 47 include properties corresponding to filtering criteria, relational operators, logical operators, search terms, functions called when properties are updated. In various embodiments functions included in search query object 47 may include functions to display an updated user interface and search results returned for a particular search. In various embodiments, user-defined schema properties and other properties within search query object 47 are continuously updated.

In the embodiment shown, when the user instantiates query object 47, the user enters at least one context field corresponding to a document tag in an at least one heterogeneous database. The context field identified by the user is a defined schema that will be used to define a relationship between two or more heterogeneous databases deemed to be important to the user.

In various embodiments drop down menus may be used to display all available context fields, and classes may be used to organize the context fields for display.

Step 2 comprises the step of mapping the user-defined schema (i.e., the selected context field) to at least one heterogeneous database in an information grid or other collection of registered heterogeneous data bases. In Step 2 the system receives a user-defined schema value representing a context field to populate or update the search query object 47. For example, a user may enter "patent case number" into user interface 45. In this exemplary embodiment, the context fields 11*a* and tags are stored for each heterogeneous database in the system and organized into classes to simplify the user interface and facilitate user access. In this example, the user-entered context field represents a first user-defined schema value.

This mapping step correlates the user-selected context field to tag values and context field stored in a global context search memory component. This memory component acts as a database of context fields associated with each heterogeneous database registered in the information grid system. In this exemplary embodiment, a list of every available (connected) database within information grid 88 may be displayed on user interface 45 in classes or organized into any other data structure known in the art.

A user does not need to know which of registered heterogeneous databases contains the context field "patent case number," and the mapping to the particular heterogeneous database is transparent to user. This user-determined schema (the selected context value) value is stored in an updated query object.

The user-defined schema value in Step 2 is mapped or associated with stored context fields 11*a* and tags within information grid 88 containing geographically dispersed databases. The context field may correspond to any external or internal tag value, or implicit or explicit document structure characteristic known in the art. In this example, the context field is "patent case number". Heterogeneous database system 100 finds a database, which maintains documents in which a patent case number can be searched using an external or internal data tag.

Step 3 comprises the step of performing a search to return a first result set SQ1. Step 4 is the step of updating the user interface to display search results. In this exemplary embodiment, search query object 47 invokes functions to update user interface 45 with the results of the query of the first data base. In this example, search query object 47 invokes functions to update user interface 45 to specify all case numbers (CNs).

Step 5 is the step of relating the search from heterogeneous database to the search results in another heterogeneous data base. Step 5 is critical because it allows the end user rather than a programmer to define critical schema relationships between databases.

Step 5 is also critical because it represents operations a user performed directly on heterogeneous databases without first importing and translating data into an interim database having a common schema. Because of the operations explicit and implicit in Step 5 (and alternatives 5*a* and 5*b*), databases external to the user's own Wide Area Network or internal network may be queried without the need for an interim translation of data into a common mark-up language format (such as XML or HTML).

In embodiment 5*a* of Step 5, the user defines a query refinement by defining a relationship between two databases through a search key process. In alternative Step 5*a*, a second dataset is retrieved using one or more of the values retrieved from the first query, which are used as a new search key. In this exemplary embodiment, the user performs successive context searches. While performing the successive context searches, the user selects a search key from a returned result set. A search key may be any search term user inputs including, but not limited to, the set of all alphanumerical characters. The API processing computer stores each user-defined search key and utilizes it as user-defined schema. The heterogeneous search system appropriately modifies or adds data to the search key property of the search query object. A user may add additional context field values, logical operators or search keys to the search query object through continuously updated user interface.

Alternative Step 5*b* is the step of invoking logical operations processes. In 5*b* the user invokes functions of a search query object with a logical operations processor within the search engine component of an API processing computer. These logical functions contain functions which may be invoked to filter the results of the queries performed. Logical operations which may be performed by a logical operations processor include, but are not limited to, the following logical operations: contains, not contains, greater than, less than, greater than or equal, less than or equal, equal to, not equal. The logical operations performed by the logical operations processor limit the scope and succession of results returned from querying the information grid. The API processing computer stores the set of logical operators searched and the results produced by updating the search query object A user may define schema from the set theoretic actions AND, OR, NOT, XOR (exclusive OR), NXOR (negation of XOR), and more complex combinations of these actions.

In various embodiments, a user may exercise a considerable amount of control to refine the actions taken at each stage. However, the specified action may be different at each stage. For example, the resulting set might be {(SQ1ΩSQ2) NOT SQ3}, which is interpreted as all database items that belong to SQ1 and to SQ2 but do not belong to SQ3.

In alternative Step 5b, the user may initiate a new query or filtering operation, or choose to invoke a relationship function using relationship processes to perform a relate or join function. Successive searches may be performed using a context search on each of the sets SQn (e.g., n=1, 2, 3).

In various embodiments the order of the queries may be arranged so that the queries with the smallest and second smallest cardinalities can be combined first, followed by combination of this result with the query having the third smallest cardinality, and so on. Various embodiments of the invention may provide processing capabilities to assist a user in structuring queries and provide user interface prompts to assist a user in logically ordering queries.

In various embodiments, a user may perform additional successive context searches and filtering searches to produce query result sets SQn (here, n=1, 2, 3, . . . ) and the context search.

In further successive context searches and filtering searches, a user may update the context field and search values properties of search query object 47.

What is claimed is:

1. A distributed computer apparatus configured to perform schema-less queries of heterogeneous databases comprising:
    at least one registrar computer configured with database management software to register a plurality of heterogeneous databases within an information grid by storing a URL at which each of said plurality of heterogeneous databases accepts search queries;
    at least one search query object which contains at least two user-defined schema values that define at least one relationship between two or more of said plurality of heterogeneous databases; and
    at least one API processing computer which provides a user interface for a user to instantiate a search query object, of said at least one search query object, which initiates and supports a search session with the information grid, wherein the user interface is updated in real time during the search session to display available context fields, wherein the search query object invokes functions to update said user interface to display results obtained from a first heterogeneous database within the information grid which are related to search results obtained from a second heterogeneous database within the information grid, wherein at least one of the first or second heterogeneous database is a schema-less database that stores data without using any schema relationships, and wherein at least the other of the first or second heterogeneous database stores data using a schema relationship.

2. The distributed computer apparatus of claim 1, wherein said at least one registrar computer is configured to store substantially all context fields associated with document tags found in each of said plurality of heterogeneous databases.

3. The distributed computer apparatus of claim 1, wherein said API processing computer is configured to store context fields associated with document tags found in each of said plurality of heterogeneous databases within said information grid and to display said context fields on said user interface.

4. The distributed computer apparatus of claim 1, wherein at least one information grid is configured with database management software to map each of said plurality of heterogeneous databases to a user-selected schema consisting of a context field.

5. The distributed computer apparatus of claim 1, wherein said user interface is updated to display at least one search result value which may be used as a search key for a subsequent query of said information grid.

6. The distributed computer apparatus of claim 1, wherein said user interface is configured to iteratively display updated search results from each of said plurality of heterogeneous databases queried.

7. The distributed computer apparatus of claim 1, wherein said plurality of heterogeneous databases store structured documents, unstructured documents, and semi-structured documents.

8. The distributed computer apparatus of claim 1, wherein said API processing computer further includes a logical operations processor operatively coupled to said user interface, and wherein said user interface is configured to receive at least one logical operator schema value supplied by said user.

9. The distributed computer apparatus of claim 1, wherein said search queries are submitted to said information grid without being translated into a common markup language format.

10. The distributed computer apparatus of claim 1, wherein said API processing computer further includes a multiple search query processor capable of producing multiple sets of said search queries and searching said plurality of heterogeneous databases using said multiple sets of search queries.

11. The distributed computer apparatus of claim 1, wherein said API processing computer further includes a relationship processor configured to perform a relate function to define a relationship between data in at least two of said plurality of heterogeneous databases.

12. The distributed computer apparatus of claim 1, wherein said API processing computer further includes a join processor configured to perform a join function to define a relationship between data in at least two of said plurality of heterogeneous databases.

13. The distributed computer apparatus of claim 1, which further includes a processor configured to perform a search using a search key obtained in a first search to perform a subsequent query of said plurality of heterogeneous databases, and wherein said subsequent query is a query performed after a previous query within a search.

14. The distributed computer apparatus of claim 1, wherein a plurality of said search results are used as a search key in a subsequent search of said plurality of heterogeneous databases.

15. The distributed computer apparatus of claim 1, which further includes a processor component capable of iteratively searching said plurality of heterogeneous databases.

16. The distributed computer apparatus of claim 1, which further includes a processor component capable of recursively searching said plurality of heterogeneous databases.

17. The distributed computer apparatus of claim 1, wherein said API processor is further configured to allow said user to update previously entered context field values.

18. The distributed computer apparatus of claim 1, wherein said search query object is repeatedly modified to update said user interface and said at least two user-defined schema values to perform a search in real-time.

19. The distributed computer apparatus of claim 1, wherein values of said available context fields are user modifiable.

20. A method for querying a schema-less database, comprising:

instantiating an instance of search query object corresponding to a search session using an API processing computer operatively coupled to a user interface;

connecting to an information grid using an API processing computer, wherein said information grid comprises a plurality of heterogeneous databases that each are accessible via a URL;

updating said search query object with at least two user-defined schemas values entered into said user interface representing a context field stored in a global context field database operatively coupled to said information grid;

mapping said search query object to a mapped database corresponding to said user-defined schema values representing a context field stored in a global context field database operatively coupled to said information grid;

updating said query object entered into said user interface with user-defined schema values representing a search term;

querying said information grid using said search term by submitting a search query to said information grid without translating said search query into a common markup language format;

updating in real time during the search session said user interface to display search results in a table format; and relating the search results of the mapped database to search results in another heterogeneous database, wherein one of the mapped database and said another database is a schema-less database that stores data without using any schema relationships and the other is a database that stores data using a schema relationship.

21. The method of claim 20, further comprising:
updating said query search object with user-defined schema values for a relational operator.

22. The method of claim 20, further comprising:
updating said query search object with user-defined schema values for a logical operator.

23. The method of claim 20, further comprising:
successively updating said user-defined logical operator property.

24. The method of claim 20, further comprising:
successively updating said user-defined context field property.

25. The method of claim 20, further comprising:
successively updating said user-defined search term property.

* * * * *